United States Patent Office 2,856,374
Patented Oct. 14, 1958

2,856,374

OIL-MODIFIED ALKYD RESIN

Benjamin A. Bolton, Hammond, Ind., assignor to Standard Oil Company, Chicago, Ill., a corporation of Indiana No Drawing. Application November 25, 1955
Serial No. 549,171

12 Claims. (Cl. 260—22)

This invention relates to oil-modified alkyd resins usable for protective coatings. More particularly, the invention relates to oil-modified alkyd resins utilizing glycols as the polyhydric alcohol components.

In the conventional oil-modified alkyd resins, glycerol or a higher alcohol is used as the polyhydric alcohol component and phthalic anhydride is used as the polybasic acid component. Glycerol and the higher alcohols are relatively expensive with respect to glycols. For economic reasons, glycols would be preferred for these materials. Also, the relatively low sublimation point of the phthalic anhydride imposes temperature and equipment limitations on the alkyd resin reaction, which limitations are economically undesirable.

An object of the invention is an oil-modified alkyd resin utilizing a glycol reactant. Another object is an oil-modified alkyd resin utilizing a polybasic acid not limited by a low sublimation temperature. Other objects will become apparent in the course of the detailed description of the invention.

The oil-modified alkyd resin of the invention is derived from the alkyd resin reaction of a glycol with a vegetable or marine oil or one of the fatty acids, and with a benzene tricarboxylic acid or one of the anhydrides thereof. The benzene tricarboxylic acid or anhydride forms from about 10 to about 50 weight percent of the reactants and sufficient glycol is charged to provide from about 5 to about 20 mole percent excess over the stoichiometric requirement.

The glycol utilized in preparing the composition may be ethylene glycol, propylene glycol or a corresponding ether glycol designated as either polyethylene glycol or polypropylene glycol. Examples of suitable ether glycols are diethylene glycol, triethylene glycol, tetraethylene glycol, dipropylene glycol and tripropylene glycol.

The tribasic acid utilized in preparing the composition may be either a benzene tricarboxylic acid or one of the anhydrides derived from such an acid. The benzene tricarboxylic acids are trimesic, trimellitic, and hemimellitic. It is preferred to utilize either trimellitic acid or trimellitic anhydride. The benzene acid charged to the reaction zone forms from about 10 to about 50 weight percent of the reactants charged, i. e. the sum of the glycol, the oil and the benzene acid. More usually, the benzene acid forms from about 20 to about 40% of the reactant.

The oil-modified alkyd resin composition utilizes in the reaction zone one or more of the conventional vegetable oils and marine oils or the fatty acids derived from one of these oils or a single one of the various fatty acids. The vegetable oils which are commonly used for this purpose are: linseed, soybean, tung, castor, dehydrated castor, oiticica, cocoanut, cottonseed, rapeseed, perilla, corn, poppyseed, tall, safflower. The marine oils commonly used are: herring, sardine and menhaden.

These vegetable and marine oils are often classified as drying, semi-drying and non-drying oils. Linseed oil is an example of a commonly used drying oil; soybean oil is a typical semi-drying oil; and cottonseed is an example of a non-drying oil. The oils may be processed to obtain a mixture of fatty acids which are designated by the name of the source oil. For example, soya fatty acids are derived from soybean oil. The more or less pure individual fatty acids may also be utilized in the preparation of the composition. Commonly utilized fatty acids are: capric, lauric, myristic, palmitic, stearic, behanic, oleic, linoleic, linolenic, ricinoleic, erucic.

The composition of the invention is the alkyd resin reaction product of a mixture of the defined glycol and the defined fatty acid or oil with the defined benzene tricarboxylic acid. In general, about ½ mole of glycol is reacted per mole of fatty acid or equivalent prior to the introduction of the benzene tricarboxylic acid into the reaction zone. However, it is preferred to charge all of the glycol and all of the fatty acid prior to the introduction of the benzene tricarboxylic acid. More glycol is charged than is needed stoichiometrically in the reaction. This excess of glycol amounts to from about 5 to about 20 mole percent over the stoichiometric requirement. When operating with the preferred amount of benzene tricarboxylic acid, it is preferred to utilize an amount of glycol from about 10 to about 15 mole percent in excess of the stoichiometric requirement.

Any of the numerous conventional procedures for the preparation of oil-modified alkyd resins may be utilized in preparing the composition of the invention. In general, the desired amount of the particular fatty acid or oil and the glycol are charged to a reaction vessel and are heated to a temperature on the order of 180° C. to 230° C., the higher temperatures being utilized with the higher boiling point glycols. A suitable catalyst such as lime or litharge is added and the reaction continued until the glycol-oil product has a methanol compatibility of about 1:5. At this point, the desired benzene tricarboxylic acid is added and a reaction carried out at either the same temperature as the alcoholosis reaction or preferably at the somewhat higher temperature of about 250° C. The acid may be charged all at once or gradually over a period of time. The reaction is continued until the desired acid number and viscosity of the reaction product have been obtained. The compositions obtainable from the reactants are illustrated by the following examples.

Example 1

In this example, the reactants charged were ethylene glycol, 7.4 grams; soya fatty acids, 16.8 grams and trimesic acid, 12.6 grams. The soya fatty acids and the glycol were charged to a flask provided with a reflux condenser, water trap and a tube for introducing nitrogen gas below the surface of the liquid in the flask. The fatty acid and glycol were heated to 185° C. before the trimesic acid addition was begun. The acid was added over a period of thirty-five minutes while the temperature was gradually raised to 250–260° C. After 1.5 hours at this temperature, the acid number of the contents of the flask had reached the desired point and the reaction was stopped.

The acid number (mg. KOH per gram) of the oil modified alkyd resin reaction product was 9.2. A 50% solution of the resin in xylene had a viscosity of C and a color of 6–7 (both Gardner).

Example 2

In this example 6.2 grams of ethylene glycol and 36.1 grams of soybean oil were charged to the flask as described in Example 1. The oil and glycol were heated to 190° C. in the presence of 0.02 gram of litharge. The heating was continued until the oil-glycol mixture had a solubility in methanol of 1 part of mixture to 5 parts of methanol. At this time 2.0 grams of triethylene glycol were added and the addition of trimesic acid was begun. The temperature of the flask was raised to 250° C. while the trimesic acid, 13.5 grams, was added over a forty-five minute time period. When the trimesic acid addition was complete, the temperature of the flask was raised to 280° C. and held at that temperature for a period of three hours when the viscosity and acid number had reached the desired points.

The oil-modified alkyd resin reaction product had an acid number of 3. A portion of the reaction product was diluted with xylene to a 60% solids content. The solution had a viscosity of Z and a color of 6-7 (both Gardner).

Having thus described the invention what is claimed is:

1. An alkyd resin composition consisting essentially of (I) the product of the reaction of (A) a glycol selected from the class consisting of ethylene glycol, polyethylene glycol, propylene glycol and polypropylene glycol and (B) a member selected from the class consisting of vegetable oil, marine oil and fatty acids having at least 10 carbon atoms, wherein said glycol is charged in an amount from about 5 to about 20 mol percent in excess of the stoichiometric requirement, at a temperature on the order of 180° C. to 230° C., said reaction being continued until the product has a methanol compatibility of about 1:5, reacted with (II) an acidic material selected from the class consisting of trimesic acid, trimellitic acid, hemimellitic acid, trimellitic anhydride and hemimellitic anhydride, wherein said acidic material forms from about 10 to about 50 weight percent of the total reactants, at a temperature on the order of 180° C. to 280° C. for a time needed to produce a given acid number and viscosity final product.

2. An alkyd resin composition consisting of (I) the product of the reaction of ethylene glycol about 6 parts by weight and about 36 parts by weight of soybean oil at about 190° C. until the product has a methanol compatibility of 1:5 with (II) triethylene glycol about 2 parts by weight and trimesic acid about 13 parts by weight at a temperature between about 250° C. and 280° C. until the reaction product has an acid number of about 3 and a Gardner viscosity of Z as a 60 percent solids solution in xylene.

3. The composition of claim 1 wherein said glycol is ethylene glycol.

4. The composition of claim 1 wherein said glycol is triethylene glycol.

5. The composition of claim 1 wherein said benzene acid is trimellitic acid.

6. The composition of claim 1 wherein said benzene acid is trimesic acid.

7. The composition of claim 1 wherein said member is soybean oil.

8. The composition of claim 1 wherein said member is cottonseed oil.

9. The composition of claim 1 wherein said member is linseed oil.

10. The composition of claim 1 wherein said member is soya fatty acid.

11. The composition of claim 1 wherein said benzene acid forms from about 20 to about 40 weight percent of the reactants.

12. The composition of claim 11 wherein said glycol is charged in an amount from about 10 to 15 mole percent in excess of the stoichiometric requirement.

References Cited in the file of this patent
UNITED STATES PATENTS

| | | |
|---|---|---|
| 1,864,909 | Jaeger | June 28, 1932 |
| 2,206,171 | Ellis | July 2, 1940 |